Patented May 19, 1925.

1,537,960

UNITED STATES PATENT OFFICE.

WILLIAM E. OLIVER, OF DETROIT, MICHIGAN, ASSIGNOR OF ONE-HALF TO LYDIA B. KOCH, OF NEW YORK, N. Y.

HARDENING AND PRESERVING COMPOSITION FOR PAPER AND OTHER FABRICS AND METHOD OF MANUFACTURING SAME.

No Drawing.     Application filed March 26, 1923.   Serial No. 627,899.

*To all whom it may concern:*

Be it known that I, WILLIAM E. OLIVER, a citizen of the United States, and a resident of Detroit, in the county of Wayne and State of Michigan, have invented certain new and useful Improvements in Hardening and Preserving Composition for Paper and Other Fabrics and Methods of Manufacturing Same, of which the following is a full, clear, and exact description.

Among the principal objects which the present invention has in view are: to render fabrics of the character mentioned non-permeable in water, odorless, tasteless, and to increase the crushing strength of said fabrics when treated with the said composition.

Any suitable fabric may be treated with the herein described composition, such as woven fabric, felt, paper, or cardboard, and similar materials may be used.

To treat the fabric, a composition is first formed by mixing commercial gelatine and arrow root in the proportions and manner hereinafter set forth.

The composition is formed by first immersing commercial gelatine in cold distilled water. The gelatine is permitted to remain in the water for a period not less than five hours, during which time, it is thoroughly and completely swollen. The surface water is then decanted, being strained through several thicknesses of gauze or other suitable filtering material. The gelatine is then heated in a double boiler or heat-jacketed vessel.

Arrow root powder is dissolved in distilled water. The proportions of water and arrow root are as four to one.

Other distilled water being approximately three times the volume of the water used for dissolving the arrow root powder is brought to a boil. To this is added the solution of arrow root, slowly stirring the solution while mixing the same.

The dissolved gelatine and dissolved arrow root are now mixed in equal proportions, the solution of arrow root being poured slowly into the solution of gelatine, both solutions being maintained hot while the mixing is being performed.

The composition may be diluted with distilled water to suit the nature of the fabric to be treated.

Where it is desired to produce a porcelain-like appearance, a small quantity either of evaporated milk or lactein is added to the composition, stirring the same into the composition vigorously and thoroughly.

The composition is poured over the fabric to be treated and said fabric is allowed to remain in the composition until saturated. It is then withdrawn and placed in suitable molds or presses and there subjected to pressure or other treatment. It will be found that when the fabric has been pressed or treated in the manner mentioned, it will have the qualities above stated.

If the solution has been provided with the evaporated milk referred to, it will also be found that the fabric has a porcelain-like appearance and quality.

Claims:

1. The method of manufacturing a hardening and preserving composition for paper and other fabrics consisting in swelling gelatine in distilled water, then dissolving the swelled gelatine in heated distilled water, then dissolving powdered arrow root in distilled water to which is subsequently added boiling water with agitation, then mixing in the presence of heat and agitating while being mixed.

2. The method of manufacturing a hardening and preserving composition for paper and other fabrics consisting in swelling gelatine in distilled water, then dissolving the swelled gelatine in heated distilled water, then dissolving powdered arrow root in distilled water to which is subsequently added boiling water with agitation, then mixing the two solutions in the presence of heat, and agitating them while being mixed, and then adding lactein to the mixture.

3. The method of manufacturing a hardening and preserving composition for paper and other fabrics consisting in dissolving swelled gelatine in heated water, then mixing the same with arrow root dissolved in boiling water, and then adding evaporated milk to the mixture.

4. A composition as characterized comprising a solution of gelatine, arrow root, and water in proportion of four parts of water to one of arrow root, and a slight quantity of lactein.

5. A composition as characterized comprising a solution of arrow root powder and water in proportion of four parts of water to one of arrow root, swelled gelatine, and a small quantity of evaporated milk.

WILLIAM E. OLIVER.